April 7, 1970 E. N. CARABATEAS 3,504,808

BOOK STORAGE AND RETRIEVAL APPARATUS

Original Filed May 18, 1966 4 Sheets-Sheet 1

INVENTOR.
EUSTRATIOS NICHOLAS CARABATEAS

BY Darby & Darby

ATTORNEYS

April 7, 1970 E. N. CARABATEAS 3,504,808

BOOK STORAGE AND RETRIEVAL APPARATUS

Original Filed May 18, 1966 4 Sheets-Sheet 2

INVENTOR.
EUSTRATIOS NICHOLAS CARABATEAS
BY Darby & Darby
ATTORNEYS

BOOK STORAGE AND RETRIEVAL APPARATUS

Original Filed May 18, 1966 4 Sheets-Sheet 3

INVENTOR
EUSTRATIOS NICHOLAS CARABATEAS

BY [signature]

ATTORNEYS

BOOK STORAGE AND RETRIEVAL APPARATUS

Original Filed May 18, 1966 4 Sheets-Sheet 4

INVENTOR
EUSTRATIOOS NICHOLAS CARABATEAS
BY
[signature]
ATTORNEYS

United States Patent Office 3,504,808
Patented Apr. 7, 1970

3,504,808

BOOK STORAGE AND RETRIEVAL APPARATUS

Eustratios Nicholas Carabateas, 35 George Sissini St., Athens, Greece

Continuation of application Ser. No. 551,041, May 18, 1966. This application Apr. 15, 1969, Ser. No. 817,285
Int. Cl. B65g *1/00*
U.S. Cl. 214—16.4 4 Claims

ABSTRACT OF THE DISCLOSURE

Apparatus for storing and retrieving books comprises a plurality of book storage frames and a special selector mechanism associated with each of said frames. Each of the frames includes a plurality of closely spaced, horizontally extending brackets, on which a plurality of unique bookholders are supported. Each bookholder holds a single book, and includes horizontally extending flanges, so as to permit a book to be supported on adjacent brackets. The bookholder further includes a retaining portion which is adapted to be engaged by a grasping member on the selector mechanism, so that any bookholder (with its book) can be removed from or returned to a special location in the book storage frame. The invention particularly lends itself to the automatic selection and retrieval of books, inasmuch as each location in a given storage frame can be identified by row and column addresses, which, in a known fashion, can be used to automatically control the selector mechanism.

This application is a continuation of U.S. application Ser. No. 551,041 filed May 18, 1966 which is now abandoned.

The present invention pertains to apparatus particularly adapted to automatically retrieve books from an extensive library and to deliver the books to a preassigned location, such apparatus further including the capability of returning books from the preassigned location to a particular storage space in said library.

Modern book libraries generally are confronted with increasingly severe space limitations and increasing numbers of books. The present invention is intended primarily to introduce an entirely new approach to the problem of book storage and retrieval permitting substantially reduced space requirements for a given number of required books. The invention also facilitates location and retrieval of a desired book, all of which is accomplished automatically with the attendant advantages of such systems. Furthermore, as explained below, the invention offers many collateral and diverse benefits of particular advantage in libraries.

Briefly, in accordance with the invention, each individual book is stored in a special holder designed to be engaged by a selector mechanism. The individual books in their holders are stored in a plurality of rows and columns in a number of novel book storage frames. Each position of a given storage frame has a unique adddess defined by the row and column of that position, whereby a selector mechanism may position a book retrieval carriage at any row and column of the storage frame. When the book removal carriage has been properly located in accordance with the invention, means are energized to withdraw the desired book from the storage frame and into the carriage. The selector mechanism then brings the carriage to a preassigned location to which the user has access and the book is deposited at this location. When it is desired to return a book to a particular address in the storage frame, the process above described is reversed.

Because of the automatic retrieval and replacement of the books, the individual storage frames may have extremely large storage capacities; in particular, the height of the various frames need not be limited by previous considerations. Of equal importance, the automatic selection apparatus permits the individual frames to be placed relatively close together with the distance therebetween being primarily a function of the length of the longest book to be stored, as will be understood from the description below.

Figure 1:
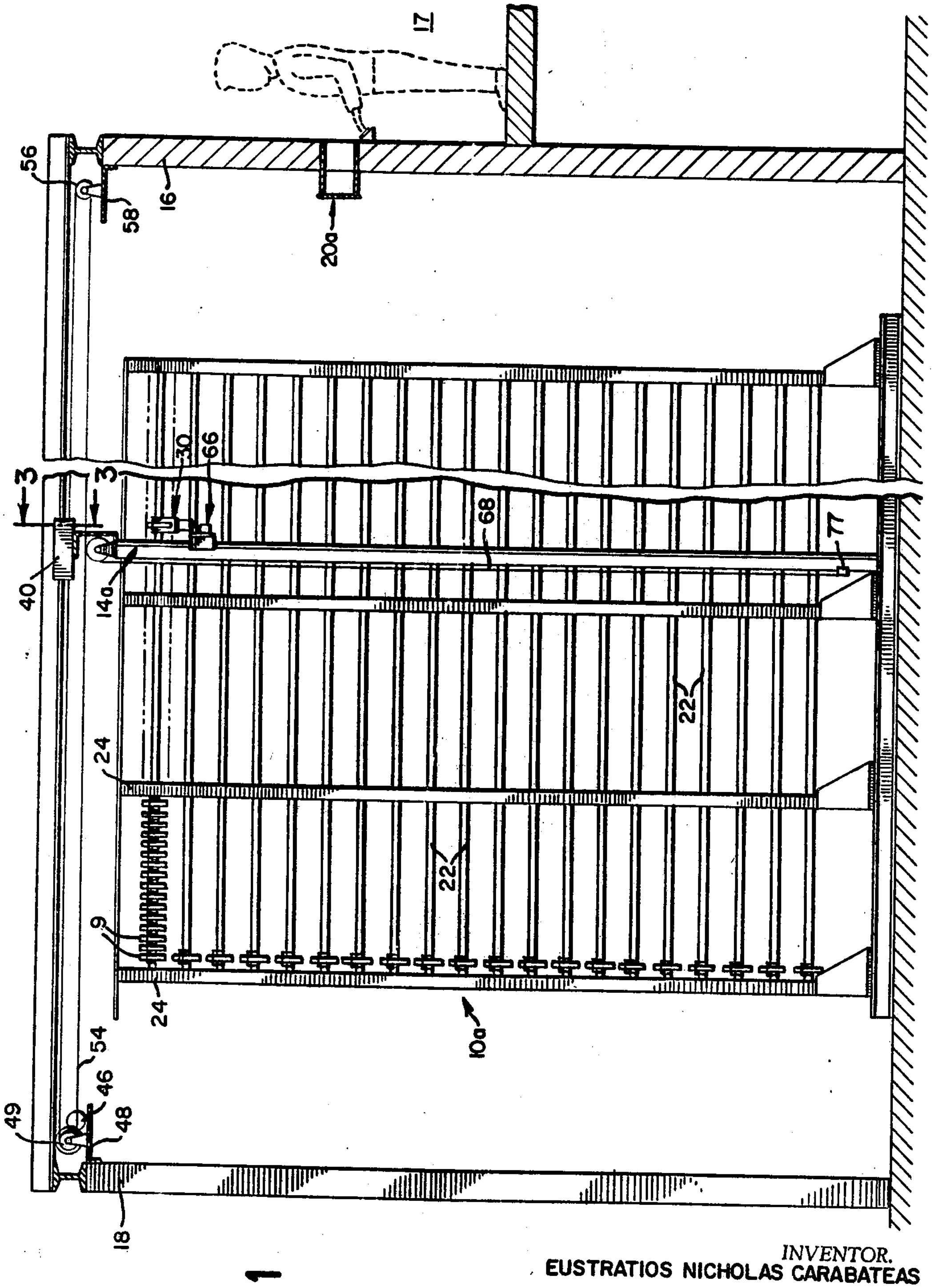
FIGURE 1 is a side elevational view, partially in section, illustrating the manner in which the selector mechanism moves with respect to a storage frame to retrieve a book and deposit it at a locaton to which the user has access.
Figure 2:
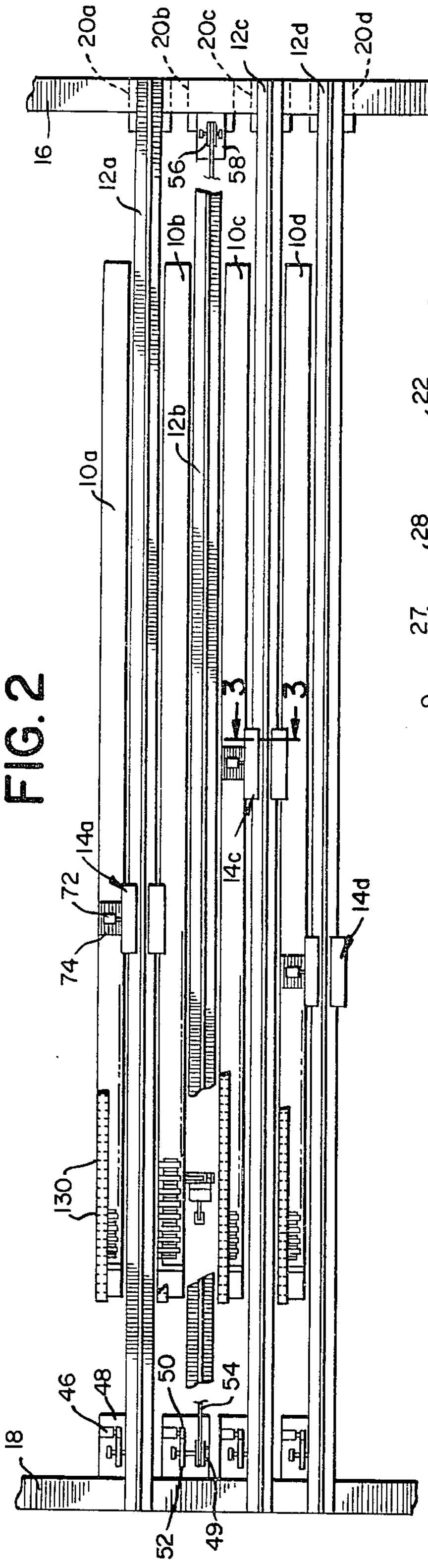
FIGURE 2 is a top elevational view of the storage frames and their associated selection mechanisms.

By referring to FIGURES 1 and 2, the general principles of the invention may be understood. The books 9 are stored in horizontal rows and vertical columns in a plurality of storage frames—10*a*, 10*b*, 10*c*, etc. Selector rails 12*a*, 12*b*, etc. are associated with the respective storage frames 10 and physically located above the storage frames, extending slightly therebeyond on both sides.

The storage frames are suitably mounted in a room which may include opposing walls 16 and 18, with wall 16 separating the book storage area from the portion of the library 17 shared by the users. At the ends of the storage frames there are respective openings, 20*a*, 20*b*, etc. in wall 16, into which selected books are placed by selector mechanisms 14*a*, 14*b*, etc. and to which a user as shown in dotted lines, has ready access.

The storage frames 10 are identical, as are the corresponding selector mechanisms 14, and, in the following description, only one of each is described. Thus, each storage frame 10 consists of a plurality of horizontal support strips 22 retained in a suitable number of vertical struts 24. Obviously, the length and number of the support strips 22 will vary depending upon particular dequirements and, as such, do not form a part of this invention. A plurality of brackets 26 extend transversely of each of the support strips 22. Each pair of adjacent brackets 26 supports a single book, as described below. The brackets may include opposing side notches 27 (FIG. 6) so that the bracket can be interlocked with notches 28 of support strips 22, although obviously the manner of connection is not material.

Figure 4:
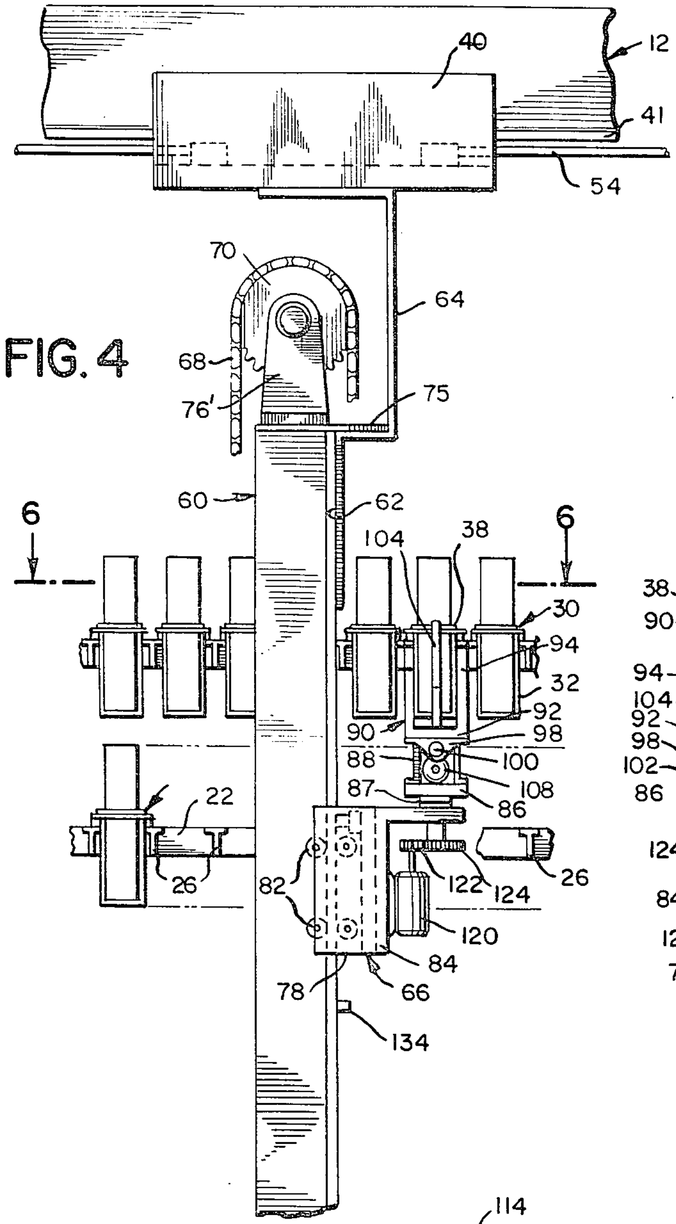
FIGURE 4 is a side elevational view showing in detail the selector mechanism and book retrieval carriage.

Each book is retained in its own individual holder 30 (FIGS. 4 and 5) for storage as well as retrieval purposes. The holder 30 consists of a U-shaped strap 32 which fits underneath the closed book and is connected to a transverse ledge 34 which fits around the bond edge of the book near the center thereof. Three rollers 36 extend downwardly from each side of the ledge 34 to facilitate retrieval and replacement of the book. A handle 38 is welded or otherwise secured to the top of the ledge 34 and extends rearwardly from the book holder as a handle by which the book holder, and thus the book, can be manipulated by the selection apparatus.

Figure 3:
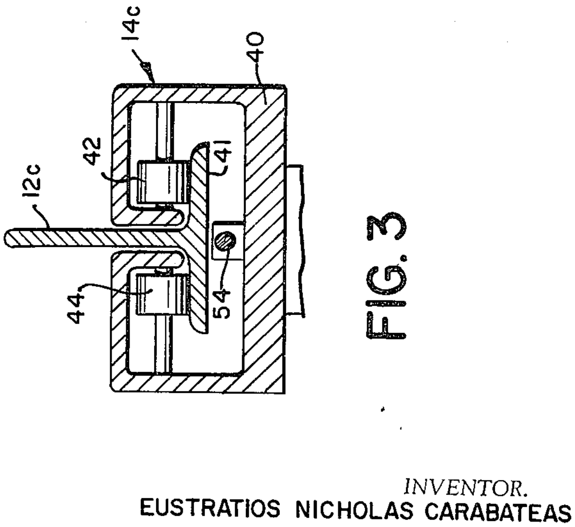
FIGURE 3 is a sectional view along the line 3—3 of FIGURE 2.

Each selector mechanism includes an upper casing 40 designed to envelop the horizontal head 41 of its associated T-shaped rail 12. A pair of rollers 42 and 44 (FIG. 3) are journalled in opposing flanges of casing 40 and contact the upper surface of head 41 to permit movement of the selector mechanism to any position with respect to its associated frame.

The selector mechanism is powered by a motor 46 (FIG. 2) supported on a platform 48 extending from the wall 18 and substantially in alignment with the corresponding storage frame. Motor 46 rotates a pulley 49 through gears 50 and 52 to drive a belt 54 which is also looped around a pulley 56 supported on a platform 58 extending from wall 16. The belt 54 is fixed to the casing 40 so that the selector mechanism 14 can be positioned along any desired column of the book frame.

The selector mechanism so far described locates the column of the storage frame in which the desired book is stored. To locate a particular book, it is also necessary to identify the row in which that book is stored. For this purpose each selector mechanism includes an elongated T-shaped bar 60, which is slightly longer than the height of its corresponding storage frame 10. Selector bar 60 includes a transverse rail 62 secured to casing 40 by bracket 64.

A carriage 66 rides vertically on the rail 62 and is moved by a pulley system including a chain 68 and sprocket 70 powered by a motor 72 through gears 74 and 76. Motor 72 is supported on a platform 75 extending from the top of selector bar 60, and the sprocket 70 is journaled in a pair of lugs 76', extending upwardly from platform 74. One end of the chain 68 is secured to the carriage 66 and the other end to a counterweight 77 (FIG. 1) so that when motor 72 is energized carriage 66 will move vertically on rail 62.

At the rear of carriage 66 two opposing walls 78 and 80 are adjacent the edges of rail 62. Four rollers 82 are suitably journaled in the walls 78 and 80 on both sides of rail 62, to permit the carriage to ride on the rail.

An L-shaped bracket 84 extends away from the selector bar 60 at the rear of walls 78 and 80. A rectangular platform 86 is disposed with its long edge parallel to rail 62 and is rotatably supported in a bearing means 87 on the horizontal portion of bracket 84. Two opposed walls 88 extend upwardly from platform 86 to support thereon a cage 90, which includes a solid floor 92 from which four corner posts 94 extend upwardly. Two horizontal parallel bars 96 extend longitudinally between both pairs of sideposts 94 to complete the cage 90.

A pair of rounded mounting blocks 98 extend downwardly from the cage floor 92 and receive a shaft 100 so as to permit rotary motion thereof. Shaft 100 includes a threaded portion 102 in threaded engagement with a bent finger 104 at its lower end. Finger 104 extends through a longitudinal slot 105 (FIG. 6) in the cage floor 92, so that the finger is maintained in its vertical position during the book retrieval operation. Shaft 100 includes a gear 106 in engagement with the output gear 110 of a motor 108, situated between platform walls 88.

With the construction as so far described, when the cage 90 is located in front of the desired book, motor 108 is energized in front of the desired book, motor 108 is energized to rotate shaft 100 so that the engagement of finger 104 and threaded portion 102 causes the finger to move toward the book with the upper portion of finger 104 immediately beneath handle 38. The actual engagement of the finger and clip requires vertical movement of the finger, which is provided by the solenoid mechanism of FIGURE 7.

Figure 6:
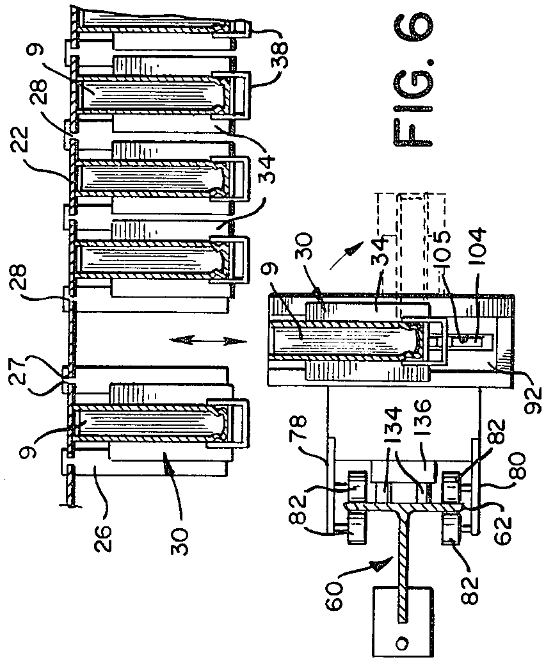
FIGURE 6 is a sectional view along the line 6—6 of FIGURE 4.
Figure 5:
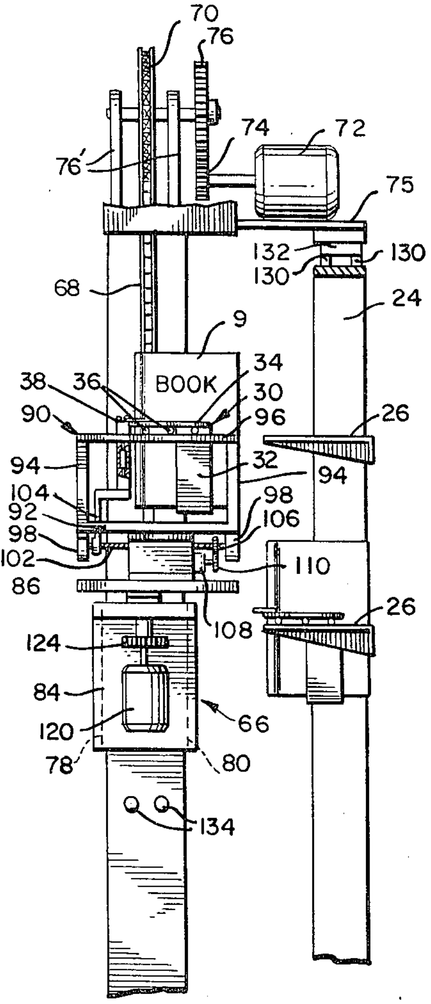
FIGURE 5 is a front elevational view corresponding to FIGURE 4.
Figure 7:
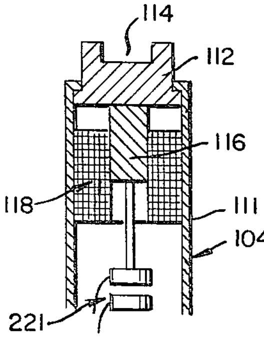
FIGURE 7 is a detailed view of an element of the book retrieval apparatus.

FIGURE 7 illustrates the upper portion of finger 104. The finger includes at its upper end a casing 111 in which a tip 112 is mounted for vertical reciprocating motion. At the top of tip 112 there is provided a notch 114 which is adapted to grasp a handle 38 of any individual book holder, as shown in FIGURES 5 and 6. Tip 112 may be mounted on top of the core 116 of a solenoid, the coil of which is shown at 118, so that when coil 118 is energized, tip 112 moves vertically so that notch 114 engages handle 38. When the energizing power is removed from coil 118 the force of gravity will cause the finger to disengage the handle 38, although if more positive action is desired, a conventional return spring may be used.

After the desired book has been located, the book is withdrawn from the storage frame 10 and deposited in the cage 90 by reversing the direction of rotation of motor 108 so that finger 104 is pulled back to the illustrated position. The lateral spacing of bars 96 may be made approximately equal to the spacing between support strips 26 of book holder 30, so that the holder will rest on the bars 96.

The next step in the process is to deliver the book to the corresponding opening 20, which merely requires that the selector mechanism 14 be brought close to wall 16 and carriage 66 to the preaddressed position of opening 20. Possibly, delivery at this point will be manual, but the invention also includes means for further depositing the book in the opening 20.

As previously noted, the platform 86 (and the cage 90 mounted thereon) may be rotated about a vertical axis. Thus, a motor 120, secured to bracket 84, drives a gear 122 which engages a second gear 124 to rotate cage 90 to the dotted line position illustrated in FIG. 6. Hence, when the book is placed in front of the opening 20, motor 120 is energized to rotate the entire cage 90 and book contained therein in this fashion. When the open end of the cage is in front of the opening 20, motor 108 again may be energized to move the finger 104 with book in its holder toward the opening. When the book is moved forward a sufficient distance so that it is within opening 28 and out of cage 90, the coil 118 may be deenergized to deposit the book.

The actual circuit used to control the different parts illustrated will vary depending upon particular requirements, and for this reason no effort has been made to illustrate in detail a specific circuit. One simple way to control the movement of the selector mechanism and carriage would be to use shorting bars to simultaneously deenergize and brake the associated motors when the respective parts are in their proper positions. For example, a series of contacts 130 (FIGS. 2 and 5) may be located along the top of each of the storage frames 10. A shorting bar 132 beneath platform 74 is adapted to contact the respective pairs of contacts 130 as the selector mechanism is moved along rail 12*a*. A conventional multi-position switch means (not shown) may be used to connect any one of the switches 130 into the control circuit of the motor 46 associated with that particular storage frame. Accordingly, when the bar 132 shorts out the selected pair of contacts 130, the circuit, in a conventional manner, will immediately brake motor 46.

In substantially the same fashion, shorting contacts 134 (FIGS. 4 and 5) may be provided along the rail 62 for engagement with a shorting bar 136 extending from the rear of the bracket 84. For simplicity, only two pairs of such contacts have been shown in FIGURES 4 and 5, although obviously there is a corresponding pair of contacts for each horizontal row of books in the storage frame. Hence, when the bar 136 shorts out the selected contacts 134, the motor 72 will immediately be braked, causing the carriage 66 and cage 90 to stop directly in front of the selected book.

Since the removal of a book from the storage frame will in all cases take the same amount of time, the energization of motor 108 may be programmed to last for a predetermined interval of time, after which the motors 72 and 46 return the carriage and selector mechanism to the desired location.

When it is desired to return a book to the storage frame, the control circuits energize the various motors to return the carriage from its position at the opening 20 to the proper storage position. The holder and book are then deposited on the storage brackets. This procedure will be obvious in view of the foregoing and therefore is not discussed in detail.

Those skilled in the article selection arts will recognize that there are numerous ways and means to physically control the positioning of the carriage. As illustrated in the preferred embodiment, the various movements are controlled by four separate motors 46, 72, 108 and 120. For purposes of explanation only, reference is now made to FIGURE 8 which illustrates in partial schematic form a possible configuration for the control circuits.

Basically, the circuit which drives the selector mechanisms 60 with respect to a given frame of books, and the circuit which vertically positions the carriage 66, are the same. Accordingly, in FIGURE 8 only the control circuit for motor 46 (which vertically positions carriage 66) is illustrated.

Figure 8:
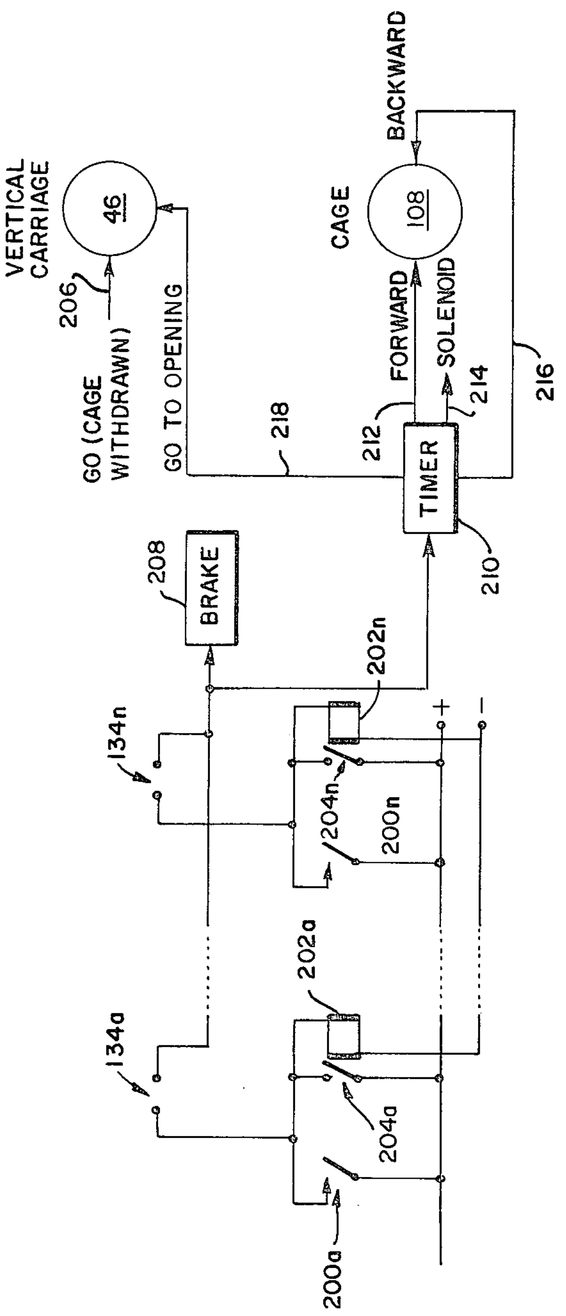
FIGURE 8 is a partial schematic diagram employed to illustrate the operating principles of a control circuit which might be used with the invention.

The pairs of contacts 134 are shown in FIGURE 8 as 134*a* . . . 134*n*, the number of contact pairs being equal to the number of horizontal rows of books. The selector switches which are operated in any desired fashion by the user are illustrated as 200*a* . . . 200*n*, and closure thereof determines the positioning of the carriage. For example, if the address of the desired book requires that the carriage stop at the vertical location corresponding to the contacts 134*a*, the user will close switch 200*a* energizing a relay 202*a* which completes a holding circuit through its relay contact 204*a*. Relay 202*a* may further energize a line 206 through conventional circuits (not shown) to drive motor 46 and cause the carriage 66 to commence vertical movement. It is further contemplated that relay 202*a* will also energize the motor 108 to initially withdraw the cage 90 into the carriage so that vertical movement of the carriage is not possible unless the selector mechanism is prepared to remove a book. The circuit for accomplishing this is obvious and is not shown in FIGURE 8.

As the carriage moves in a vertical direction, the shorting bar 136 (see FIG. 4) ultimately closes contacts 134*a* applying an energizing signal through relay contact 204*a* and the shorting bar 136 to a braking unit 208 which inhibits movement of the carriage. As previously noted, the horizontal selection occurs in the same fashion and, by way of example, may occur prior to the vertical selection. Accordingly, at the same time brake 208 is energized, a signal is coupled to a timer unit 210 to initiate movement of the cage toward the book.

At this time, a signal appears on line 212 driving motor 108 so that the cage proceeds in a forward direction toward the book. After a predetermined time interval, this signal is removed from line 212 and a signal applied to line 214 to energize the solenoid 118 (see FIG. 7) causing the fingertip 112 to engage the book handle 38. After another time interval sufficient to permit this operation, a signal appears on line 216 to reverse the direction of rotation of motor 108 and withdraw the cage back into the carriage as described above. When the book is within the cage 90, the energizing signal may also be removed from line 214 and an energizing signal applied to line 218 to drive motor 46 so that the carriage is positioned at a predetermined vertical address corresponding to the window 20 to which the user has access (see FIG. 1). Timer 210 may comprise a motor-driven multi-position switch wherein the stationary contacts are shaped and positioned so that the driven armature applies energizing signals thereto for preselected intervals at preselected times after the motor is initially energized by the signal through the closed switch 134*a*.

The operation is the same as that described regardless of which of the switches 200*a*–200*n* is energized, with the positioning of the carriage being dependent upon closure of the corresponding contacts 134 by the shorting bar 136.

The energization of motor 120 has not been shown in FIGURE 8, but this also could be an obvious feature dependent, for example, upon the position of the carriage with respect to the window 20. Hence, when the selector mechanism approaches the window, closure of contacts situated in the corresponding rail 12 could energize the motor 120 to turn the carriage 90 toward the window. After the book has been deposited in the opening, the subsequent return of the selector mechanism could then in an obvious fashion energize the motor 120 in the opposite direction, causing the carriage to rotate back to its illustrated position in FIGS. 4, 5 and 6.

The initial position of the selector mechanism may be directly in front of the opening 20 with the carriage in its uppermost vertical position. Hence, the initial horizontal and vertical movements of the carriage will always be initiated in one direction to simplify the control circuits, although obviously the invention contemplates more sophisticated designs in which the carriage is capable of being positioned at any desired location from any other location without hunting.

The invention lends itself to many novel and useful features in the book retrieval art. For example, the finger 104 (or carriage) may contain a weight responsive switch 221 (FIG. 7) which, after an unsuccessful book selection operation, will energize a signal lamp at the user location to indicate that the desired book is not in storage.

To simplify the storage process and avoid human errors in returning the books to the proper location, each book may be equipped with a separate card (not shown) coded in any desired fashion, such as by contacts corresponding to the X and Y location of the book. This card is inserted in a special location on each book holder when the book is placed there to be returned and which may be read by a conventional decoder (not shown) which senses the card when the book holder is on the carriage. This activates the signals used to control the illustrated motors so as to position the carriage at the book location automatically. In this way many books may be placed in an opening C with their position information thus coded and the selector mechanisem can therefore take them one after another to their appropriate location. Such a card may also be used to indicate the location of a given book within the reading room. For example, when the user retrieves a desired book and returns to one of the tables within a reading area, the card may be placed in a special decoder located at the respective tables. Subsequently, if it is desired to locate this book within the reading area, a central means may be used in an obvious fashion to interrogate each of the individual decoders located in the reading room for the address associated with the desired book. When a direct comparison is noted, a signal can be given to indicate the table at which the book is being used.

By way of example, each horizontal row of storage frame 10 may hold from 200 to 300 books with the storage frame including anywhere from 30 to 50 such rows. Thus, if the entire library contains 30 to 60 such book frames, the total number of books which may be stored will be between 180,000 and 900,000. Obviously, these numbers are not intended as limiting in any respect.

The invention is also not restricted to specific means for moving the selector mechanism 14 and the carriage structure 66. For example, suitable chain or direct gear drives could be substituted for the illustrated pulley arrangement. Thus, the motor 46 could be located directly on the selector mechanism 14 with its output gear engaging a linear gear to position the selector mechanism. A similar scheme could be employed to vertically position the carriage.

Of course, since books vary significantly in size, the individual book holders may be similarly sized, with a given class of book holders being used for only certain size books. Furthermore, in the interests of space, all of those books within a given size classification may be stored in a particular storage frame or frames. The books themselves, however, may be classified in any desired manner such as by author, title, subject, etc., and may be arranged in a large catalog similar to a telephone book with each book being identified by a number address corresponding to its Y and X position within the storage frame. Knowing the address of a desired book the user simply presses the proper button (for example) corresponding to such address, whereby the above described operation commences.

The basic principles of the invention may be further expanded to save additional space by storing books on both sides of each individual storage frame. The books may be stored in substantially the same manner as that illustrated, but, in this case, each selector mechanism (of which there will be half as many) will cooperate with adjacent sides of two storage frames, and the carriage will operate to select books from either side. This would require a more complex control circuit, but one which would still be well within state of the art techniques, and would considerably add to the number of books which could be stored in a given volume.

The operation by which the books themselves are deposited in the respective openings 20 has not been described in detail since it will be obvious how the selector mechanism of the invention could readily deposit the book. For example, brackets (not shown) equivalent to brackets 22 may be provided within the openings 20 on which the book holders may be deposited.

Thus, the invention provides book storage and retrieval apparatus in which the space required to store a given number of books is substantially reduced, and in which the selection and retrieval of desired books may be made without human intervention. The invention will also provide numerous other valuable benefits. For example, as previously noted, each book may be provided with an address card so that in returning the book to its proper storage position there is no possibility of human error. This card may further be used to identify the location within the reading area where a book is being used. Additionally, the card can serve as part of a convenient method for indicating which books have been loaned outside of the library. Numerous other modifications and benefits of the invention will also be obvious and the invention should not be limited except as defined by the following.

I claim:

1. Apparatus for storing and retrieving books, comprising at least one book storage frame, a separate holder for each book, each holder comprising two outwardly extending support rims interconnected by a base portion for supporting the bottom edge of a book and a grasping portion generally transverse to said base portion, said book storage frame including elongated shelf members extending outwardly therefrom for supporting a plurality of said holders in rows and columns, each shelf member extending between two horizontally adjacent bookholders and including horizontal sections for supporting a support rim of each of said adjacent bookholders, at least one selector bar movable in a first direction with respect to said frame, a book retrieval and replacement carriage mounted on said selector bar and movable in a direction transverse to said first direction so that said carriage can be positioned adjacent any one of the holders in said frame, said carriage comprising a platform, a retaining cage including two horizontal bars mounted above said platform, a grasping member movable relative to said platform and bars, moving means for moving said grasping member toward and away from the grasping portion of said one holder, and means for causing said grasping portion to grasp said grasping member when said carriage is adjacent a preselected bookholder, said means for moving said grasping member being supported on said platform, said horizontal bars being adapted to retain the support portions of a selected holder when said selected holder is within said carriage, whereby a retained holder and its associated book can be retrieved from or returned to said storage frame, and means for turning said retained holder substantially ninety degrees whereby access to said book can be provided at a place remote from its storage position in said storage frame.

2. Apparatus for storing and retrieving books according to claim 1, including a plurality of book storage frames and a separate selector mechanism for each of said storage frames.

3. Apparatus for storing and retrieving books according to claim 1, including means for automatically positioning said carriage adjacent a preselected holder.

4. Apparatus for storing and retrieving books according to claim 3, wherein said means for moving said grasping members comprises a reversible motor mounted on said carriage and movable therewith.

References Cited

UNITED STATES PATENTS

| | | | |
|---|---|---|---|
| 2,549,239 | 4/1951 | Robertson et al. | 214—16.4 |
| 2,652,939 | 9/1953 | Murphy | 214—16.1 |
| 2,751,093 | 6/1956 | Theibault | 214—16.1 |
| 2,785,809 | 3/1957 | Riblet | 214—16.1 |
| 3,405,818 | 10/1968 | Humenuk | 214—16.4 |
| 2,386,520 | 10/1945 | Watson et al. | |
| 2,451,368 | 10/1948 | White et al. | |
| 2,707,666 | 5/1955 | Becker | 312—319 |
| 2,941,738 | 6/1960 | Burke et al. | 214—16.4 |
| 3,049,247 | 8/1962 | Lemelson | 214—16.4 |
| 3,063,769 | 11/1962 | Graber et al. | 214—16.4 |
| 3,297,379 | 1/1967 | Artaud et al. | 214—16.4 |

FOREIGN PATENTS

| | | |
|---|---|---|
| 1,338,707 | 8/1963 | France. |
| 1,044,712 | 11/1958 | Germany. |

ROBERT G. SHERIDAN, Primary Examiner

R. B. JOHNSON, Assistant Examiner

U.S. Cl. X.R.

312—223